United States Patent Office
3,014,018
Patented Dec. 19, 1961

3,014,018
PROCESS FOR THE POLYMERIZATION
OF ALPHA-OLEFINS
Giulio Natta, Piero Pino, and Giorgio Mazzanti, Milan, Italy, assignors to Montecatini-Societa Generale per l'Industria Mineraria e Chimica, Milan, Italy
No Drawing. Filed Feb. 25, 1958, Ser. No. 717,339
Claims priority, application Italy Feb. 28, 1957
2 Claims. (Cl. 260—93.7)

This invention relates to polymeric alpha-olefins and to a process for producing the same.

It has been proposed to polymerize ethylene to polymers of high molecular weight with the aid of catalysts prepared from titanium tetrachloride and an organometallic compound such as triethyl aluminum, i.e., by a process of ionic polymerization.

Generally, in ionic type polymerizations the more active the catalyst used the higher is the molecular weight of the polymer obtained. The polymerization of ethylene with the catalysts aforesaid follows the general pattern for ionic polymerizations, that is, the polyethylenes of highest molecular weight are obtained with the most active catalysts prepared from $TiCl_4$ and the organometallic compound.

The use of large excesses of trialkyl aluminum was disclosed for preparing the catalyst for the ethylene polymerization, molar ratios of the trialkyl aluminum to titanium tetrachloride as high as 70:1 being shown. In fact, it has been stated that the typical mol ratio of titanium tetrachloride to trialkyl aluminum for use in preparing the catalyst for ethylene polymerization is one mol of the $TiCl_4$ to 8–12 mols of Al-trialkyl, that is, the minimum mol ratio of Al-trialkyl to $TiCl_4$ for the ethylene polymerization has been given as 8:1.

In our pending applications Ser. Nos. 514,097, 514,098 and 514,099, we disclosed that, unexpectedly, propylene and other alpha-olefins of the general formula $CH_2=CHR$ where R is a hydrocarbon radical, can be polymerized with the aid of catalysts prepared from $TiCl_4$ and organometallic compounds of metals of Groups I to III of the Periodic Table (Mendeleef) and more especially trialkyl aluminum, dialkyl aluminum monohalides, alkyl zinc and alkyl lithium compounds, to mixtures of entirely new linear polymers containing substantially no branches longer than R and comprising different steric structures which have been identified as "isotactic" and "atactic" respectively, by one of us, G. Natta.

The term "isotactic" originated by Natta to define the new polymers, is not synonymous with "crystalline." "Isotactic" identifies a particular, regular steric structure in a macromolecule for an alpha-olefin polymer, which structure is an inherent property of the macromolecule and exists independently from the physical state of the polymers (i.e. independently of the fact that the polymer may be, under suitable conditions, in a crystalline or in a non-crystalline state), and which remains when the polymer is in the liquid state (in solution or melted) on in the amorphous, unstable state obtained by quenching the melt.

The Natta isotactic structure is illustrated in the model below, in which the macromolecule main chain is supposed extended in a plane.

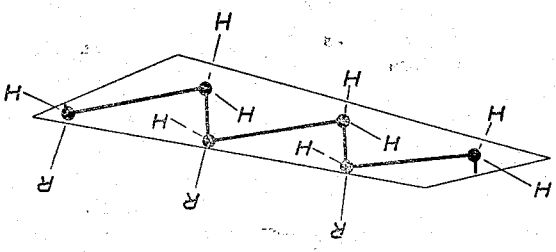

In the model as shown all the R groups ($CH_3$ in polypropylene) attached to the tertiary asymmetric carbon atoms, are on one side of the plane containing the polymer main chain, and the hydrogen atoms bound to those carbon atoms are on the opposite side. For a polymer having an "atactic" structure, in an analogous model the R groups and hydrogen atoms bound to tertiary asymmetric carbon atoms would be randomly distributed on the two sides of the plane.

We found that the alpha-olefins present important differences over ethylene when polymerized with the aid of catalysts as mentioned herein. Thus, as shown in said pending applications, the new polymeric alpha-olefins are obtained when molar ratios of the $TiCl_4$ and organometallic compound as low as 1:3 are used in preparing the catalyst. Also, the alpha-olefins do not behave in the same way as does ethylene, or in general in accordance with the normal pattern for ionic polymerizations. In the case of the alpha-olefins, polymerization thereof with the most active catalysts prepared from $TiCl_4$ and the organometallic compound does not result in polymers having the highest possible molecular weight.

As we have discovered and disclosed previously, the catalysts prepared from transition metal compounds of Groups IV to VI of the Periodic Table (Mendeleef) and organometallic compounds of metals of Groups I to III of the table exhibit stereospecificity in the polymerization of the alpha-olefins and the catalyst-forming components can be selected to yield catalysts capable of orienting the polymerization of the monomer to the production of predominantly isotactic polymers, or to the production of predominantly atactic polymers.

The catalyst prepared from $TiCl_4$ and, e.g., triethyl aluminum, in the molar ratios disclosed in our pending applications favored the production of linear, regular head-to-tail polymers comprising the Natta "atactic" structure, whereas the catalysts prepared from $TiCl_3$ and triethyl aluminum oriented the polymerization of the alpha-olefins to the production of polymers comprising the Natta "isotactic" structure.

We now find that the stereospecificity of the catalysts prepared from $TiCl_4$ and the alkyl compounds of metals of the 1st to 3rd groups of the Periodic Table, and the rate of polymerization of the alpha-olefins with those catalysts, are both sensitive to the molar ratio of the two components used in preparing the catalysts, and depend on use of molar ratios falling within narrow, selected ranges which vary with and depend on the alkylating capacity of the particular metal alkyl reacted with the titanium tetrachloride. Both the rate of polymerization and the composition of the polymerizate can be varied by varying the molar ratio of the catalyst-forming reactants within the narrow ranges referred to, and as explained more in detail hereinbelow.

The range of optimum molar ratios of the catalyst-forming reactants to be used is different for metal alkyls having relatively high alkylating capacity, such as trialkyl aluminum and alkyl lithium compounds, than it is for metal alkyls having relatively low alkylating capacity, such as dialkyl aluminum halides.

Specifically, we find that, in the case of the polymerization of propylene with catalysts obtained by reacting $TiCl_4$ with trialkyl aluminum or with alkyl lithium compounds, the critical molar ratio is in the range of 1:1 to 1:3. The rate of polymerization of the propylene is varied remarkably by varying the molar ratio of $TiCl_4$ to aluminum trialkyl or lithium alkyl within that range of 1:1 to 1:3. In particular, we find that the highest polymerization rate is obtained (as shown in Examples 2, 3 and 4 below) by using the components in a ratio of 2 mols of the metal alkyl to one mol of $TiCl_4$. As shown in our pending applications supra, the polymers of the alpha-olefins comprising the Natta isotactic structure can be separated from the crude polymerizate on the basis of their steric structure by means of selective solvents. Thus, by treating our crude polypropylene successively with hot acetone, ether, and n-heptane, we obtained, as residue of the boiling n-heptane extraction, the most highly isotactic polymers contained in the polymerizate.

We now find that the rate at which the propylene polymerizes is not only highest when the molar ratio of the $TiCl_4$ to metal alkyl is in the range 1:1 to 1:3, but that the highest proportion of isotactic polypropylene not extractable from the crude polymerizate with boiling n-heptane is obtained using the catalyst prepared from $TiCl_4$ and metal alkyl in molar ratios of 1:1, 1:3 or below the content of isotactic polymer being somewhat lower when the molar ratio of $TiCl_4$ to metal alkyl is 1:2.

As stated above, in the case of polymerizing the alpha-olefins with the catalysts prepared from $TiCl_4$ and the methyl alkyl (and unlike ethylene or ionic polymerizations generally), the most active catalysts do not yield polymers having the highest possible molecular weight. However, we find that, in the case of the alpha-olefins, the molar ratio of $TiCl_4$ to metal alkyl does influence the molecular weight of the polymerizate obtained and that, within limits, the molecular weight of the polymerizate can be varied by varying said ratio.

Specifically, we find that when the catalyst which results in the highest polymerization rate is used, i.e., a catalyst prepared from the alkyl aluminum or alkyl lithium compound and $TiCl_4$ in a molar ratio of 2:1, the polymers obtained have an intrinsic viscosity lower than the viscosity of the polymers obtained (other conditions being equal) using catalysts prepared from the metal alkyl and $TiCl_4$ in a ratio other than 2:1. As we have noted hereinabove, this is most unexpected and is contrary to what generally occurs in ionic type polymerizations where the most active catalysts normally yield polymers of the higher molecular weight.

When the catalyst is obtained by reacting an organometallic compound having an alkylating capacity lower than that of the alkyl aluminum and lithium compounds with $TiCl_4$, the polymerization rate also varies with variation in the molar ratio of the catalyst-forming components, but in a way completely different than when the alkyl aluminum or alkyl lithium compound is used.

For example, when the alkyl metal compound is dialkyl aluminum monochloride, the polymerization rate increases regularly with increase in the ratio $Al(C_2H_5)_2Cl:TiCl_4$ between 1:1 and 16:1 and then decreases for ratios higher than 20:1. The maximum polymerization rate is therefore obtained with such catalysts at molar ratios of the components in the range 15:1 and 20:1, as shown in Example 5, below. Using the catalysts prepared from the alkyl metal compounds of relatively low alkylating capacity, in the molar ratios stated, it is also observed (see Example 5 below) that the most active catalysts result in polymers containing the lowest proportion of isotactic polymer and having the lowest molecular weight.

We determined the rate at which propylene polymerized in the presence of the catalysts prepared from $TiCl_4$ and the metal alkyl by determining either the amount of propylene absorbed in a given unit of time, or the amount of polymer produced during a given time period.

We find that the catalytic activity of the products obtained in accordance with this invention, by reacting $TiCl_4$ with the alkyl metal compounds, in the molar ratios indicated and depending on the alkylating capacity of the metal alkyl, decreases with time, whether the products are in use as catalysts for the alpha-olefin polymerization or not. Thus, our tests for measuring the polymerization rate of propylene with these catalysts, by determining the amount of propylene absorbed in a given unit of time, show that the instantaneous rates of polymerization decrease when the time which elapses between the preparation of the catalyst and introduction of the monomer increases. More precisely, the polymerization rate decreases more quickly in the first 30 minutes after formation of the catalyst and much more slowly thereafter.

Since the decrease with time in the catalyst activity occurs whether the products are in use as catalysts or not, e.g., when the catalysts are stored after preparation thereof, it is evident that the decreased activity is due, mainly, to a modification of the catalyst with time, rather than to any alteration thereof which is directly connected with the polymerization process.

As shown in Example 1, when a series of polymerization runs are carried out and all factors are equal except the time which elapses between the preparation of the catalyst and the introduction of the monomer, which is varied from run to run, the instantaneous polymerization rates reach almost identical values in all runs, provided the times at which the comparison is made are measured from the moment in which the $Al(C_2H_5)_3$ and $TiCl_4$ are reacted, and not from the moment in which the monomer is contacted with the catalyst. On the other hand, the stereospecificity of these catalysts for the alpha-olefin polymerization does not vary as a function of the ageing time.

The alkyl metal compounds which can be used in preparing the present catalysts are compounds of metals of the 1st, 2nd, and 3rd groups of the Periodic Table in which at least all but one valency of the metal are satisfied by alkyl radicals containing, e.g., from 2 to 16 carbon atoms and the remaining valency, if any, is satisfied by one of said alkyl radicals or by halogen. By alkyl metal compounds of relatively high alkylating capacity we mean compounds of the metals which have an alkylating capacity similar to or approximating that of aluminum trialkyls and lithium alkyls. By alkyl metal compounds of relatively low alkylating capacity, we mean compounds of the metals as defined herein and which have an alkylating capacity similar to or approximating that of dialkyl aluminum monochloride.

The following examples are given to illustrate this invention, it being understood that these examples are not intended to be limiting.

EXAMPLE 1

The apparatus employed consists of a stainless steel cylinder of 800 cc. capacity, provided with a manometer and containing liquid propylene. This cylinder is connected with a tank having the capacity of 5,850 cc., provided with a manometer and a Griesheim pressure reducer, in which gaseous propylene is kept at pressures varying between 7 and 6 atmos. Through this pressure regulator the tank is connected with the polymerization vessel by means of a stainless steel coil. The polymerization vessel consists of a 1,060 cc. stainless steel shaking autoclave, provided with a manometer, and electrically heated, the temperature being regulated by regulating the voltage.

The polymerization autoclave is kept at 60° C., flushed several times with nitrogen and then evacuated until it is completely free of air and moisture. A solution of 2.75 g. triethyl aluminum (free of alkyl aluminum hydrides and of halogens and containing only 5% diethyl aluminum monoethylate as an impurity) in 100 cc. heptane and successively a solution of 1.73 g. titanium tetrachloride in 200 cc. heptane are introduced into the autoclave within about 10 seconds. The autoclave is then shaken and, after the times indicated in Table 1, propylene is quickly introduced from the tank until a pressure of 5 atm. is obtained in the autoclave. In the tank, the pressure is then brought again to 7 atm. by means of the cylinder containing liquid propylene. The pressure in the autoclave is kept constant at 5 atm., and the course of the polymerization is followed by observing the pressure drop in the tank, from which the weight in grams of propylene absorbed in 5 minute intervals is calculated. Every time the pressure decreases to 6 atm., it is brought again to the initial value of 7 atm. by means of the cylinder containing liquid propylene. In Table I below, the course of the instantaneous polymerization rates, in runs carried out introducing the monomer at various times after the preparation of the catalyst, are shown. In Table II, the percentage of residue obtained after extracting with boiling n-heptane the crude polymers obtained in the aforementioned runs are reported.

*Table I*

| Time after the formation of the catalyst, minutes | Instantaneous rates of polymerization (g./min.) | | | |
|---|---|---|---|---|
| | $\mu=2$ min. | $\mu=15$ min. | $\mu=30$ min. | $\mu=120$ min. |
| 4.5 | 0.80 | | | |
| 9.5 | 0.47 | | | |
| 14.5 | 0.39 | | | |
| 19.5 | 0.32 | 0.35 | | |
| 24.5 | 0.27 | 0.30 | | |
| 29.5 | 0.23 | 0.25 | | |
| 34.5 | 0.21 | 0.23 | 0.20 | |
| 39.5 | 0.19 | 0.20 | 0.19 | |
| 44.5 | 0.17 | 0.18 | 0.17 | |
| 49.5 | 0.16 | 0.17 | 0.16 | |
| 59.5 | 0.14 | 0.15 | 0.15 | |
| 69.5 | 0.13 | 0.13 | 0.13 | |
| 89.5 | 0.12 | 0.12 | 0.11 | |
| 109.5 | 0.10 | 0.11 | 0.09 | |
| 119.5 | 0.09 | 0.10 | 0.085 | |
| 124.5 | 0.09 | 0.095 | 0.083 | 0.11 |
| 129.5 | 0.088 | 0.093 | 0.082 | 0.10 |
| 149.5 | 0.080 | 0.09 | 0.08 | 0.095 |
| 199.5 | 0.07 | 0.08 | 0.065 | 0.08 |
| 269.5 | 0.06 | 0.07 | 0.055 | 0.06 |
| 389.5 | 0.05 | 0.05 | 0.05 | 0.05 |

$\mu$=time elapsed between the preparation of the catalyst and the introduction of propylene into the polymerization autoclave.

*Table II*

| Time elapsing between the formation of the catalyst and the beginning of the polymerization, minutes | Residue after extraction with boiling n-heptane, percent |
|---|---|
| 2 | 37.3 |
| 15 | 36.9 |
| 30 | 38.2 |
| 120 | 37.8 |

EXAMPLE 2

In the apparatus described in Example 1, propylene polymerization runs are carried out keeping the temperature of the polymerization autoclave at 60° C. and the pressure at 5 atm. In all runs the catalyst was prepared by reacting variable amounts of $Al(C_2H_5)_3$ dissolved in 50 cc. n-heptane with 0.00455 mol $TiCl_4$ dissolved in 100 cc. n-heptane, and after 2 minutes introducing the monomer to be polymerized. After 30 minutes the runs were stopped by injecting 50 cc. methanol into the autoclave. The polymer obtained was purified from the inorganic products present by treatment with warm ether and diluted hydrochloric acid, and successive complete coagulation with a methanol-acetone mixture. The solid product was then separated by filtration and dried by heating under vacuum. The grams of propylene absorbed in 30 minutes, calculated from the pressure decrease in the tank during the polymerization, are in agreement with the amount of polypropylene found. In Table III the amount of propylene absorbed in 30 minutes by varying the molar ratio $Al(C_2H_5)_3/TiCl_4$, are shown; the amounts of residue after extraction with boiling n-heptane and the intrinsic viscosities of the polypropylenes obtained are also reported in Table III below.

*Table III*

| $TiCl_4$ mols used | $Al(C_2H_5)_3$ mols used | $Al(C_2H_5)_3/TiCl_4$ | $C_3H_6$ absorbed in 30 min., g. | Residue after extraction with boiling n-heptane | |
|---|---|---|---|---|---|
| | | | | Percent | $[\mu]$ |
| 0.00455 | 0.00455 | 1 | 7.8 | 35 | 3.26 |
| 0.00455 | 0.00569 | 1.25 | 10.5 | 25 | 2.6 |
| 0.00455 | 0.00683 | 1.5 | 11.5 | 22 | 2.62 |
| 0.00455 | 0.0091 | 2 | 17 | 23 | 2.16 |
| 0.00455 | 0.0114 | 2.5 | 12.3 | 29 | 2.7 |
| 0.00455 | 0.01365 | 3 | 7.1 | 39 | 2.78 |
| 0.00455 | 0.0182 | 4 | 5.2 | 38 | 2.41 |
| 0.00455 | 0.0228 | 5 | 5.1 | 37 | 2.43 |
| 0.00455 | 0.0364 | 8 | 5 | 35 | 2.54 |

EXAMPLE 3

Under the same conditions as described in Example 2, propylene polymerization runs are carried out using catalysts obtained by reacting variable amounts of $Al(C_6H_{13})_3$ with 0.00455 mol $TiCl_4$ and introducing also in this case propylene after 2 minutes. In Table IV, the variations in the amount of propylene absorbed in 30 by minutes by varying the $Al(C_6H_{13})_3/TiCl_4$ molar ratio is reported. The table also shows the amounts of residue after extraction of the crude polymerizate with boiling n-heptane and the intrinsic viscosity of the polypropylenes obtained.

*Table IV*

| $TiCl_4$ used mols | $Al(C_6H_{13})_3$ used mols | $Al(C_6H_{13})_3$ mols/$TiCl_4$ mols | $C_3H_6$ absorbed after 30 min., g. | Residue after extraction with boiling n-heptane | |
|---|---|---|---|---|---|
| | | | | Percent | $[\mu]$ |
| 0.00455 | 0.00683 | 1.5 | 10 | 19.5 | 2.8 |
| 0.00455 | 0.0091 | 2.0 | 16.7 | 19 | 2.5 |
| 0.00455 | 0.0102 | 2.25 | 14.9 | 21.5 | 2.7 |
| 0.00455 | 0.0109 | 2.4 | 12.7 | 24 | 2.6 |
| 0.00455 | 0.0127 | 2.8 | 8.5 | 30 | 2.5 |

EXAMPLE 4

In the apparatus described in Example 1, propylene polymerizations runs are carried out keeping the temperature of the polymerization autoclave at 50° C. and the pressure at 4 atm. In all these runs the catalyst was prepared by reacting variable amounts of $LiC_4H_9$, dissolved in 100 cc. n-heptane, with 0.00455 mol $TiCl_4$ dissolved in 100 cc. n-heptane, and introducing, after 3 minutes, the monomer to be polymerized.

After 120 minutes the runs were stopped by injecting 50 cc. methanol into the autoclave; the polymer obtained was separated and purified as in Example 2. In Table V the various amounts of propylene absorbed in 120 minutes by varying the $LiC_4H_9/TiCl_4$ molar ratio, and the amounts of residue obtained by extracting the crude polymerizate with boiling n-heptane are reported.

Table V

| TiCl₄ used mols | Li(C₄H₉) used mols | Li(C₄H₉) mols/TiCl₄ mols | C₃H₆ absorbed in 120 min., g. | Residue after the extraction with boiling n-heptane, Percent |
|---|---|---|---|---|
| 0.00455 | 0.00455 | 1 | 3.1 | |
| 0.00455 | 0.00796 | 1.75 | 19.7 | 25 |
| 0.00455 | 0.0091 | 2 | 26 | 26 |
| 0.00455 | 0.0102 | 2.25 | 21.5 | 25 |
| 0.00455 | 0.0125 | 2.75 | 7.8 | 30 |
| 0.00455 | 0.0205 | 4.5 | 0.8 | |

EXAMPLE 5

Under the same conditions as in Example 2, propylene polymerization runs are carried out using catalysts obtained by reacting variable amounts of $Al(C_2H_5)_2Cl$ with 0.00455 mol $TiCl_4$, introducing also in this case propylene after 2 minutes. Table VI below reports the variation in the amount of propylene absorbed in 30 minutes by varying the $Al(C_2H_5)_2Cl/TiCl_4$ molar ratio and also the amounts of residue after extraction with boiling n-heptane and the intrinsic viscosities of the polypropylenes obtained.

Table VI

| TiCl₄ used mols | Al(C₂H₅)₂Cl used mols | Al(C₂H₅)₂Cl mols/TiCl₄ mols | C₃H₆ absorbed in 30 min., g. | Residue after extraction with boiling n-heptane Percent | [μ] |
|---|---|---|---|---|---|
| 0.00455 | 0.0091 | 2 | 2.9 | | |
| 0.00455 | 0.01365 | 3 | 3.5 | 16.3 | 2.0 |
| 0.00455 | 0.0182 | 4 | 7.45 | 22.8 | 2.0 |
| 0.00455 | 0.0273 | 6 | 10.2 | 30.5 | 2.5 |
| 0.00455 | 0.0365 | 8 | 15.5 | 28 | 2.3 |
| 0.00455 | 0.0455 | 10 | 18.7 | 28.2 | 2.0 |
| 0.00455 | 0.0546 | 12 | 23.3 | 26.7 | 1.9 |
| 0.00455 | 0.0682 | 15 | 29.3 | 22.5 | 1.7 |
| 0.00455 | 0.0774 | 17 | 28.2 | 23 | 1.9 |
| 0.00455 | 0.0910 | 20 | 27.4 | 21.9 | 1.8 |
| 0.00455 | 0.1139 | 25 | 17 | 25.6 | 2.1 |

Polymerization of the alpha-olefins with the present catalysts can be carried out at a temperature of −80° to 220° C., and under normal atmospheric pressure or a slightly increased pressure such as a pressure of up to 30 atmospheres. Higher pressures may be used, if desired.

The polymerization is usually carred out in a hydrocarbon solvent, preferably paraffinic in character, which is inert to the catalyst, such as, for example, n-heptane, n-octane, a light gasoline fraction free of olefinic bonds, etc. The alpha-olefin to be polymerized may also be the inert polymerization medium.

The catalyst may be prepared in the presence of the inert hydrocarbon solvent, in a separate reactor, and then introduced into the polymerization reactor such as a suitable rotating autoclave. The catalyst may also be prepared in the presence of an alpha-olefin and specifically in the presence of the alpha-olefin to be polymerized.

As will be apparent, this invention provides a process for polymerizing the alpha-olefins with catalysts prepared from titanium tetrachloride and the alkyl metal compounds which is based on our discovery that, in the case of the alpha-olefins and for optimum results with respect to both the rate at which the alpha-olefin polymerizes and the stereospecificity of the catalyst for orienting the polymerization to the production of polymers comprising the isotactic structure, the molar ratios of the $TiCl_4$ and metal alkyl are critical and different from the molar ratios which have been disclosed for use in preparing the catalysts to be used in the polymerization of ethylene.

In practice, proceeding in accordance with our invention, it is possible to select the metal alkyl (on the basis of its alkylating capacity) and the molar ratio thereof to the $TiCl_4$, within the ranges given herein, which will result in the production of the polymeric alpha-olefin in the shortest possible time consonant with the desired proportion of isotactic structure content.

The invention has the additional advantage that, operating with the catalysts prepared from the $TiCl_4$ and in the molar ratios stated herein, the resulting polymers have a relatively low (though still very high) molecular weight, as shown by the intrinsic viscosity determined in tetralin, and are, therefore, very well adapted to be worked up to shaped articles by conventional methods using standard apparatus.

This application is a continuation-in-part of our applications Serial Nos. 514,097, 514,098 and 514,099, all filed June 8, 1955.

Since some variations are possible in details, such as in the particular organometallic compound reacted with the $TiCl_4$, without departing from the spirit of our invention, we intend to include within the scope of the appended claims all such modifications and changes as may be apparent to those skilled in the art.

What is claimed is:

1. In a process for polymerizing propylene to linear, regular head-to-tail polypropylene characterized by a regular structure, by bringing the propylene into intimate contact, in an inert hydrocarbon solvent, with a catalyst prepared from titanium tetrachloride and, as a reducing agent therefor, a dialkyl aluminum monohalide in which the alkyl radicals contain from 2 to 16 carbon atoms, the improvement which comprises controlling the rate at which the propylene is polymerized by using a catalyst prepared from the titanium tetrachloride and reducing agent in a molar ratio between 1:15 and 1:20.

2. The process according to claim 1, characterized in that the catalyst is prepared from titanium tetrachloride and diethyl aluminum monochloride in a molar ratio of 1:15 to 1:20.

References Cited in the file of this patent

UNITED STATES PATENTS

| 2,824,090 | Edwards et al. | Feb. 18, 1958 |
| 2,874,153 | Bowman et al. | Feb. 17, 1959 |

FOREIGN PATENTS

| 534,792 | Belgium | Jan. 31, 1955 |
| 538,782 | Belgium | Dec. 6, 1955 |
| 540,459 | Belgium | Aug. 31, 1955 |
| 1,135,808 | France | Dec. 22, 1956 |
| 526,101 | Italy | May 14, 1955 |

OTHER REFERENCES

Natta et al.: La Chimica e l'Industria, vol. 38, No. 2, pages 124–27, February 1956.

UNITED STATES PATENT OFFICE
Certificate of Correction

Patent No. 3,014,018  December 19, 1961

Giulio Natta et al.

It is hereby certified that error appears in the above numbered patent requiring correction and that the said Letters Patent should read as corrected below.

Column 2, lines 1 to 10, the model should appear as shown below instead of as in the patent:

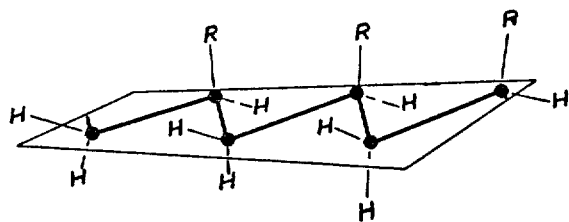

Signed and sealed this 28th day of August 1962.

[SEAL]

Attest:
ESTON G. JOHNSON,
*Attesting Officer.*

DAVID L. LADD,
*Commissioner of Patents.*